United States Patent [19]

Löfgren et al.

[11] 4,409,476
[45] Oct. 11, 1983

[54] FIBER OPTIC TEMPERATURE-MEASURING APPARATUS

[75] Inventors: Folke Löfgren; Sven-Erik Söderstrom, both of Västerås, Sweden

[73] Assignee: ASEA Aktiebolag, Västerås, Sweden

[21] Appl. No.: 273,118

[22] Filed: Jun. 12, 1981

[30] Foreign Application Priority Data

Jun. 16, 1980 [SE] Sweden ................................ 8004447

[51] Int. Cl.³ ........................ G01J 5/10; G01K 11/20; G08C 15/06
[52] U.S. Cl. ................................ 250/227; 250/231 R; 374/161
[58] Field of Search ................... 250/231 R, 227, 226; 374/161, 162

[56] References Cited

U.S. PATENT DOCUMENTS 4,223,216  9/1980  Quick et al. ................ 250/231 R X
4,249,076  2/1981  Bergstrom et al. ......... 250/231 R X Primary Examiner—David C. Nelms
Assistant Examiner—Edward P. Westin
Attorney, Agent, or Firm—Watson, Cole, Grindle & Watson

[57] ABSTRACT

The invention relates to a fiber optic temperature-measuring apparatus, based on the photo-luminescence of a solid material which is subjected to the temperature to be measured. The apparatus is characterized in that several sensors made of such a temperature-sensitive luminescent material are located in various places, each one being connected to a light-emitting diode via at least one optical fiber. Luminescent light emitted from each sensor is arranged to be supplied, via at least one separate optical fiber, possibly partially via the above-mentioned fiber and a fiber branch, to a receiver unit, common to all the sensors, the excitation light signal from each light-emitting diode being time-division multiplexed.

11 Claims, 3 Drawing Figures

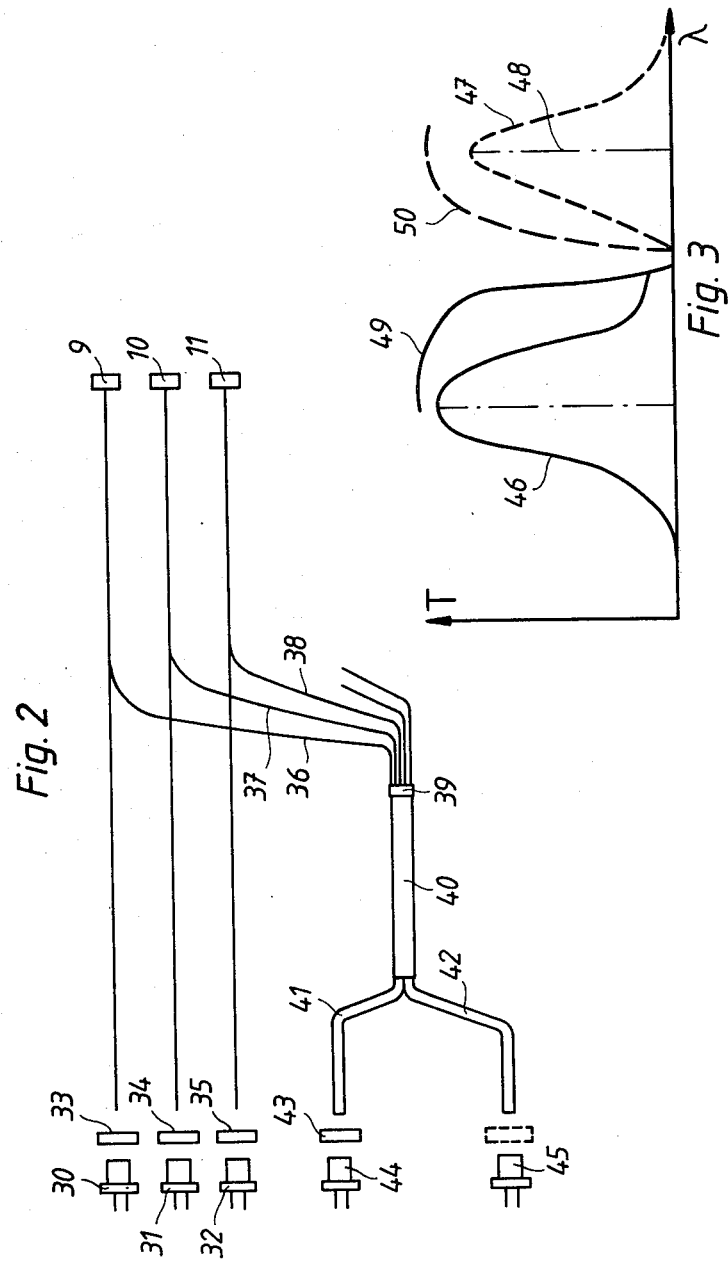

FIBER OPTIC TEMPERATURE-MEASURING APPARATUS

TECHNICAL FIELD

This invention relates to a fiber optical temperature-measuring apparatus, which operates on the principle of sensing the photo-luminescence of a solid material which is subjected to the temperature to be measured.

BACKGROUND ART

An apparatus of the above-discussed type is disclosed in U.S. patent application Ser. No. 194,397 filed on Oct. 6, 1980, in the names of Olof Engström and Christer Ovrén, and assigned to a common assignee with the present application, (the disclosure of which is incorporated herein by reference). This U.S. patent application describes a device in which light is conducted via at least one optic fiber towards a material which is in optical contact with the fiber and which has temperature-dependent luminescent properties, whereby luminescence occurs. The light thus emitted is conducted via at least one optic fiber, possibly wholly or partially in common with the above-mentioned fiber, to an electronic measuring means. The material consists of a semiconductor material with temperature-dependent luminescence. This principle of temperature measurement involves a reliable, economical and robust measuring apparatus, which can be used with advantage in difficult environments or environments which are difficult to reach, for example where there are strong electric fields.

The references to "light" in this specification should be taken to include electromagnetic radiation which is not necessarily in the visible region of the spectrum, and references to "photo-luminescence", "photo-diode" and "light-emitting diode" (or "LED") should also be taken to include properties and devices operating in regions outside the visible spectrum.

The present invention represents an improvement of the above-mentioned concept, where it is desired to determine temperatures at a plurality of locations while at the same time reducing the considerable costs associated with the provision of a separate electronic measuring means (with its electronic and optical equipment) for each measuring location. It has proved difficult to find a fiber optical solution to this problem, but the present invention provides such a solution.

DISCLOSURE OF THE INVENTION

According to the present invention, there is provided, a fiber optic temperature-measuring apparatus comprising a plurality of sensors made of a solid material having temperature-dependent photo-luminescent properties and each arranged in a different location where temperature is to be sensed, a source of incident light for each sensor which incident light is capable of making the respective sensor luminesce, an optical fiber for each source and respective sensor positioned to feed incident light from the former to the latter, a luminescent light receiving unit, a further optical fiber for each sensor, each said further optical fiber terminating adjacent to the receiving unit and positioned to receive luminescent light from the respective sensor, electronic measuring means to process the output of the receiving unit, and means to sequence the operation of said plurality of sources so that the incident light therefrom is time-division multiplexed.

It it thus possible to provide a separate sensor at each of a number of different measuring locations and to feed the outputs from the different sensors to a common receiver section with its electronic measuring unit. With a common control unit for the apparatus it is possible to activate the various LEDs (one for each sensor), in consecutive order by time division multiplexing, and at the same time to measure the signal/signals from the corresponding sensor via the common control unit. This measurement is independent of other sensors since these are not activated at this time. It is further possible, by means of various arrangements to be described hereafter, to eliminate error sources due to ageing of components, and light losses in the optical system.

Among the semiconductor materials which can be used for the sensors to give them the desired temperature-dependent luminescent properties may be mentioned AlP, AlAs, GaP, GaAs, InP, InAs, $In_{1-x}Al_xP$, $In_{1-x}Ga_xP$, $Ga_{1-x}Al_xP$, $In_{1-x}Al_xAs$, $In_{1-x}Ga_xAs$, $Ga_{1-x}Al_xAs$, $InAs_{1-y}P_y$, $GaAs_{1-y}P_y$, x and y being between 0 and 1, or ZnTe, ZnSe, ZnS, ZnO, CdTe, CdSe or CdS. GaP may be doped with Zn and O or Cd and O, and ZnSe may be doped with Cu or Mn.

BRIEF DESCRIPTION OF DRAWINGS

The invention will be exemplified in further detail, by way of example, with reference to the accompanying drawings, in which:

FIG. 2 shows a second embodiment of apparatus according to the invention, and

FIG. 3 is a graph representing the wavelength signals appearing in the apparatus of FIGS. 1 or 2.

DESCRIPTION OF PREFERRED EMBODIMENTS

Figure 1:
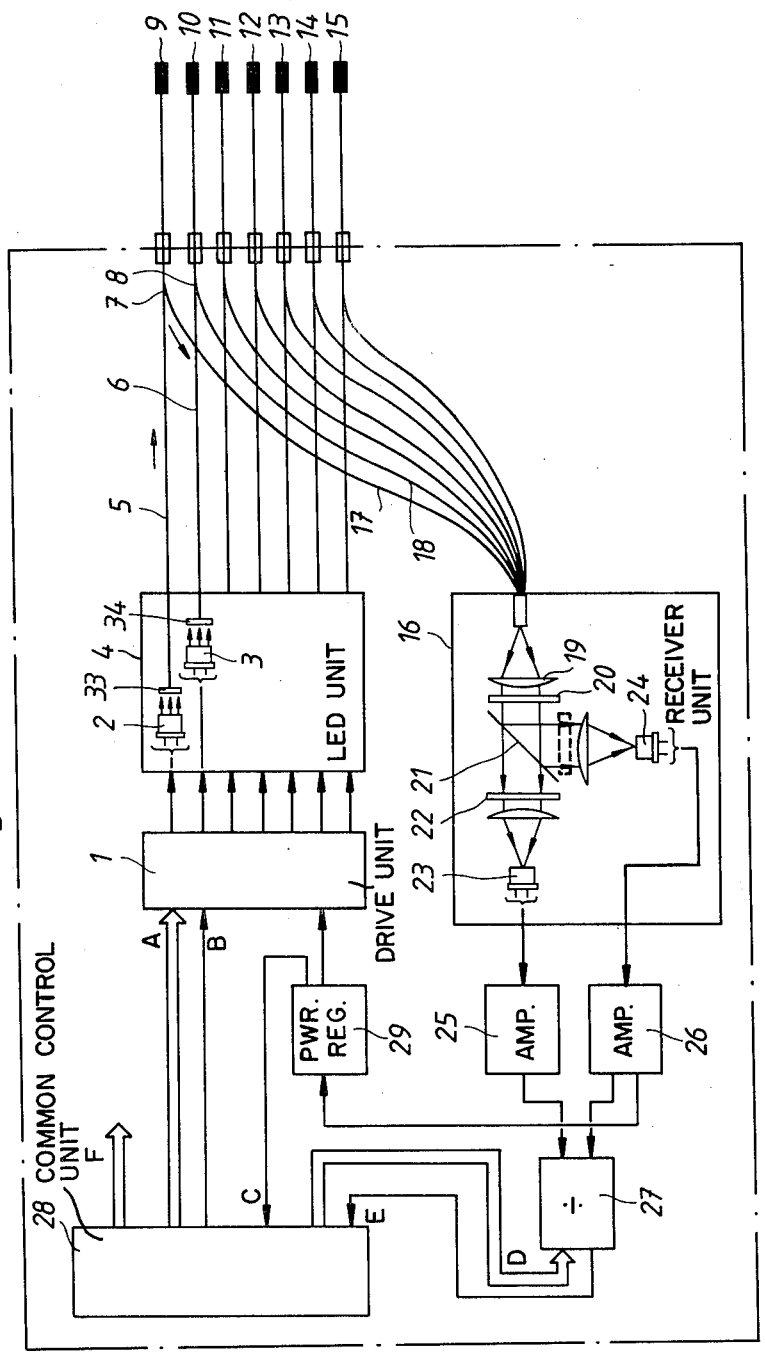
FIG. 1 shows a first embodiment of apparatus according to the invention.

FIG. 1 shows a number of temperature-sensitive sensors 9–15 of photo-luminescent material located at seven different measuring locations. Each sensor comprises a piece of semi-conductor material having temperature-dependent luminescent properties and being positioned at different, often normally difficult accessible measuring locations.

A drive unit 1 activates seven LEDs 2, 3, etc., each during a different time interval (i.e. on the basis of time division multiplexing). This sequential activation is controlled by a common control unit 28, for example a computer or a microprocessor.

Each LED 2, 3, etc. is provided with a filter 33, 34, etc. and feeds its output light, via the filter, into a separate (one for each diode) fiber optic conductor to the respective one of the sensors 9–15. When an incident light signal is received by a sensor, photo-luminescence occurs, and a light signal of a different wavelength from that of the incident light is emitted, the wavelength of the emitted light signal being dependent on the temperature of the sensor in question.

The light emitted from each sensor is led to a common receiver unit 16 with an electronic measuring member. Each light signal from the respective sensor has at least one separate light conductor 17, 18, etc. and these are shown branching from the light supply guides 5, 6, etc. via fiber branches 7, 8, etc. It is, of course, also possible to dispense with the branches and make the fibers 17, 18 etc. extend all the way back to the sensors.

The signals received by the receiver unit 16, which signals are also time division multiplexed, are allowed to pass through a lens (or lens system) 19 and then through a filter 20 which blocks the wavelengths of the incident light signals. At a beam divider 21, for example a half-silvered mirror or a dichroic mirror, the received signal is divided into two parts, one of which is supplied to a photo-diode 23, (via a filter 22 which attenuates some wavelength part(s) of the signal) and possibly via other optical members, and the other part of which is supplied, unfiltered or via a filter (shown dotted), to another photo-diode 24. Where a filter is used in the path of the other part, this filter attenuates a different part of the signal than the filter 22 and this enables the elimination of error sources, as discussed below.

The output signals of the photo-diodes 23 and 24 are amplified in units 25 and 26 and are supplied to a quotient former 27 or the like, the output signal of which is thus a measuring signal providing a measure of the temperature sensed at the corresponding sensor 9–15.

The measuring signal from the unit 27 is supplied to a measuring device, directly or (as shown in FIG. 1), after processing in the control unit 28 which contains components to correct for non-linearity in the sensors and/or the filters. The measured value from the control unit 28 can be presented to each channel at the same time as the corresponding LED is activated. The measuring signal may be analog or digital. The numeral 29 designates a power regulator for the transmitting LEDs. It is thus clear that the different emitted light signals appearing in the different light conductors 17, 18, etc., are all forwarded to a common beam divider 21 and are analyzed sequentially in the appropriate time slot corresponding to the sequence of activation of the corresponding LEDs 2, 3, etc., so that the temperature values at the seven different sensors 9–15 can be indicated one after another.

With respect to FIG. 1, the control signals for the LED's are fed from control unit 28 to drive unit 1 through connector A, and timing signals are transmitted from control unit 28 to drive unit 1 through connector B. The signal from detector 24 in receiver unit 16 is amplified by amplifier 26 and input to power regulator 29 which controls the output of the LED's through drive unit 1. An output C from power regulator 29 is also input to control unit 28 whenever the measuring range is exceeded such that no more power is obtained.

A digital signal D is fed from control unit 28 to quotient forming circuit 27, such that when there is coincidence between signal D and the signal input to quotient forming circuit 27 that signal is stored in control unit 28. That signal is transmitted over connector E. The output F from control unit 28 may be used for display purposes.

FIG. 2 shows, purely schematically, a second embodiment, in which excitation light from three LEDs 30, 31 and 32 is supplied, via filters 33–35, which block the wavelengths of the luminescence signals, to the sensors 9, 10, 11 by time division multiplexing, said sensors then emitting light with a different and temperature-dependent wavelength which, via separate fibers 36, 37, 38 and a filter 39 which blocks the wavelengths of the excitation light, is supplied to a common thicker optical fiber 40 which permits transmission of all the incoming emitted light signals.

The activation of the LEDs 30–32 takes place by time multiplexing in the same way as that described with reference to FIG. 1. After passage through the fiber 40, the light signals are divided into two branches 41, 42, independently of from which sensor 9–11 the signal has been emitted. The fiber 40 with the branches 41 and 42 replaces the beam divider 21 and its associated means shown in FIG. 1. The signals in the branch 41 pass through a filter 43, which blocks part of the signals received from the fiber 40, and is supplied to a photo-diode 44, whereas the signals in the branch 42 are supplied directly to another photo-diode 45 (or via a filter (shown dotted) which blocks another part of the signals). The output signals from the photo-diodes 44 and 45 can be processed in the same manner as described with reference to the signals from the photo-diodes 23 and 24 in FIG. 1.

The numbers of LEDs and sensors shown in FIGS. 1 and 2 are arbitrarily chosen and it will be appreciated there is no particular significance in the choices of seven and three shown in those figures.

In the graph of FIG. 3, wavelength $\lambda$ is plotted along the x-axis and the magnitude T of the light signal is plotted on the y-axis. The excitation light from an LED is shown at 46 (as an unbroken line) and the luminescent light, emitted from a sensor at a particular temperature, is shown at 47 (as a broken line). The center line 48 of the response curve 47 will move along the x-axis as the temperature of the luminescent material changes. The filters 22 and 43, respectively, block part of the luminescent light signals, for example a part to the left of the line 48, and could have the transmission characteristic shown at 50. The amplitude of the signal passing through the filter 22 or 43 is thus dependent on the position of the line 48, which in turn is temperature-dependent. A quotient of this filtered signal and the total signal 47 are thus also temperature-dependent.

The reason for comparing the two signals in this way is that certain sources of error, (e.g. loss from the fibers, ageing of components or external interference) can thus be eliminated.

The filter 43 and the filter shown in dotted lines in FIG. 2 and the corresponding filter in FIG. 1 may also be band pass filters, working on each side of the line 48 in FIG. 3.

The curve 49 in FIG. 3 represents the transmission characteristic of the filters 33–35 and shows how wavelengths in the range of the luminescent light are filtered out from the signals emitted by the LEDs 2, 3, etc. and 30–32. By means of the filters 20 and 39, the non-desired part of the curve 46, which has not been blocked by the filters 33–35 is blocked from the receiver unit 16.

The LEDs 2, 3 etc. could be made of a GaP semiconductor material (to emit a green light) and the sensors 9–15 could be made from a GaP crystal doped with Zn and O. Other choices for the semiconductor material from which the sensors 9–15 could be made are a GaP crystal doped with Cd and O, ZnS doped with Cu or ZnSe doped with Mn.

The embodiments described with reference to the drawing may be varied in many ways within the scope of the following claims.

What is claimed is:

1. A fiber optic temperature-measuring apparatus comprising
 a plurality of different sensors made of a solid material having temperature-dependent photo-luminescent properties and each arranged in a different location where temperature is to be sensed, a source of incident light for each sensor which incident light is capable of making the respective sensor luminesce, an optical fiber for each source and respective sensor positioned to feed incident light from the former to the latter, a luminescent light receiving unit, a further optical fiber for each sensor, each said further optical fiber terminating adjacent to the receiving unit and positioned to receive luminescent light from the respective sensor, electronic measuring means to process the output of the receiving unit, and means to sequence the operation of said plurality of sources so that the incident light therefrom is time-division multiplexed.

2. A temperature-measuring apparatus according to claim 1, further including a common control unit arranged to activate the sources in consecutive order and, simultaneously with activation of the source to arrange for the electronic measuring means to read the output of luminescent light from the respective sensor.

3. A temperature-measuring apparatus according to claim 1 or claim 2, in which the solid material from which the sensor is constructed is selected from the group of semi-conductor materials consisting of AlP, AlAs, GaP, GaAs, InP, InAs, $In_{1-x}Al_xP$, $In_{1-x}Ga_xP$, $Ga_{1-x}Al_xP$, $In_{1-x}Al_xAs$, $In_{1-x}Ga_xAs$, $Ga_{1-x}Al_xAs$, $InAs_{1-y}P_y$, $GaAs_{1-y}P_y$, x and y being between 0 and 1, ZnTe, ZnSe, ZnS, ZnO, CdTe, CdSe and CdS.

4. A temperature-measuring apparatus according to claim 3, in which the semiconductor material is GaP with a dopant selected from the group consisting of Zn and O, and Cd and O.

5. A temperature-measuring apparatus according to claim 3, in which the semiconductor material is ZnSe with a dopant selected from the group consisting of Cu and Mn.

6. A temperature-measuring apparatus according to claim 1 or claim 2, further comprising a filter arranged to block light of the wavelength(s) of the incident light and disposed in the light path between each sensor and the receiving unit.

7. A temperature-measuring apparatus as claimed in claim 1 or claim 2, in which each said further optical fiber branches away from the respective first-mentioned optical fiber.

8. A temperature-measuring apparatus according to claim 7, in which a filter is positioned between each source and the respective branch between the optical fibers, each said filter passing the incident light from the respective source, but blocking the luminescent light from the respective sensor.

9. A temperature-measuring apparatus according to claim 1 or claim 2, in which the signals arriving at the common receiver unit are arranged to pass through a beam divider, arranged in the receiver unit, and thus divided into two parts, one part being supplied directly to a first photo-detector and the other part being supplied through a still further filter, arranged to attenuate part of the luminescent light, to a second photo-detector, the output signals from said first and second photo-detectors being fed to a unit in which they are compared, to produce a comparison signal which is a measure of the temperature of the sensor independent of ageing of the latter and light losses in the optical fibers.

10. A temperature-measuring apparatus according to claim 9, in which part of the signal which is supplied to said first photo-detector is blocked by a yet further filter which blocks another part of the signal than the part blocked by said still further filter to the second photo-detector.

11. A temperature-measuring apparatus according to claim 1 or claim 2, in which said further optical fibers from the sensors, are supplied to a common thicker light transmission means which transmits all the incoming signals, which light transmission means at the opposite end is divided into two branches, one branch leading to one photo-detector with a filter which transmits part of the wavelength range of the luminescent light signals, and the other branch leading to another photo-detector with a filter which transmits a different part of the luminescent light signals, the output signals of the two photo-detectors after amplification being arranged to be compared by a comparison means.

* * * * *